March 1, 1949. E. F. W. ALEXANDERSON 2,463,233
PULSE ECHO APPARATUS FOR SPOTTING SHELLFIRE
Filed Jan. 22, 1943 2 Sheets-Sheet 1
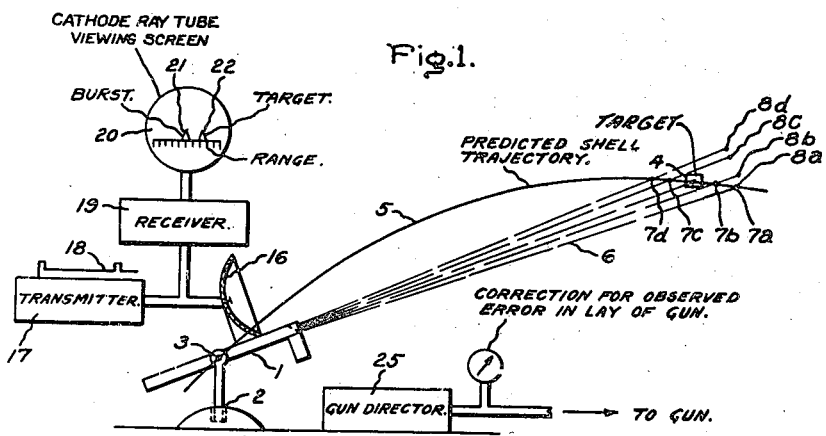
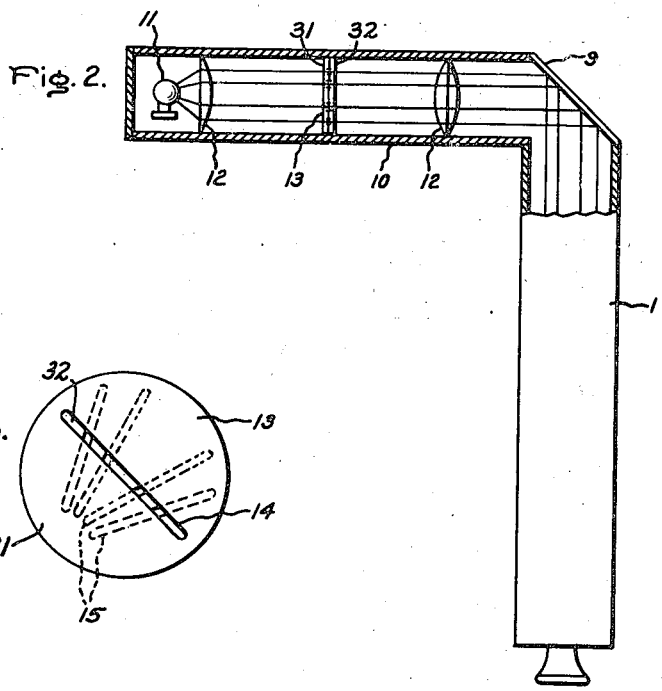
Inventor:
Ernst F. W. Alexanderson,
by Harry E. Dunham
His Attorney.

March 1, 1949. E. F. W. ALEXANDERSON 2,463,233
PULSE ECHO APPARATUS FOR SPOTTING SHELLFIRE
Filed Jan. 22, 1943 2 Sheets-Sheet 2

Inventor:
Ernst F. W. Alexanderson,
by Harry E. Dunham
His Attorney.

Patented Mar. 1, 1949

2,463,233

UNITED STATES PATENT OFFICE 2,463,233

PULSE ECHO APPARATUS FOR SPOTTING SHELLFIRE

Ernst F. W. Alexanderson, Schenectady, N. Y., assignor to General Electric Company, a corporation of New York Application January 22, 1943, Serial No. 473,200

3 Claims. (Cl. 343—5)

1

The present invention relates to the spotting of shell bursts to provide information for correcting the lay of the gun from which the shells are fired.

An object of my invention is to provide an improved pulse echo arrangement for determining the range of the burst in order that its location may be determined with respect to the predicted position of the burst at the observed range.

Figure 4:
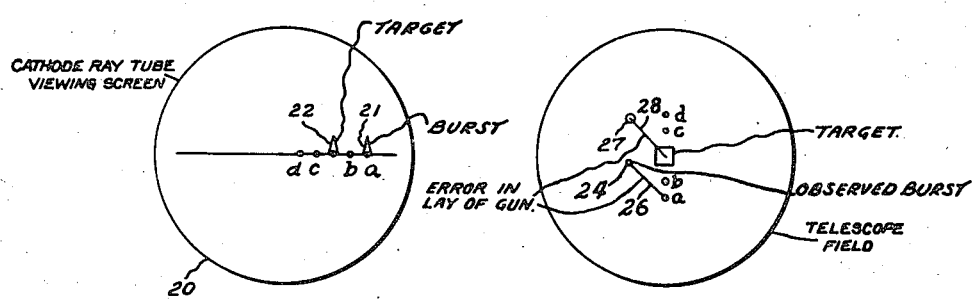
Figure 5:
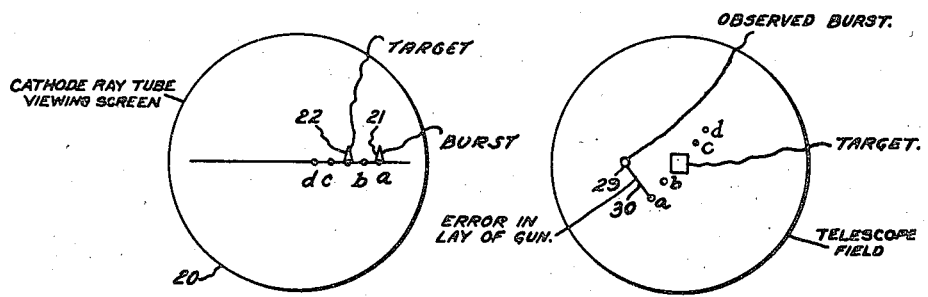
Figure 6:
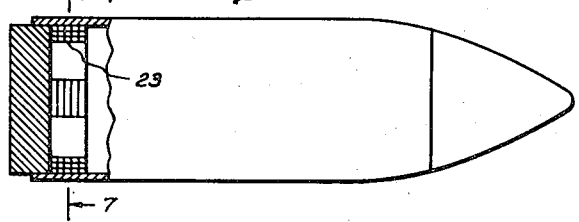
Figure 7:
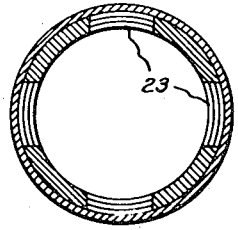

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a diagram of the equipment for spotting; Fig. 2 is a view of the spotting telescope; Fig. 3 is a diagrammatic view of the shutter providing the scale for the predicted positions of the shell at ranges in the vicinity of the target; Figs. 4 and 5 represent typical observations of the burst; Fig. 6 is an elevation of a shell containing wires to be dispersed by the force of the explosion to produce a cloud of antennas for reflecting radio waves; and Fig. 7 is a section taken on line 7—7 of Fig. 6.

Referring to the drawings, Fig. 1 represents a telescope 1 pivoted at 2 and 3 for movement in azimuth and elevation so the operator can follow a target 4. The telescope has a field of vision including the target and the region in the vicinity of the target in which shells may burst. The gun, directed at the target, of course, lays at a greater angle with respect to the horizontal than does the telescope. Due to this super elevation of the gun, the predicted shell trajectory 5 (a trajectory determined by the gun and its pointing) rises above the line of sight 6 of the telescope so that points 7a, b, c, d on the trajectory (having a spacing of for example 100 yards) would (if visible) appear in the field of the telescope as projections 8a, b, c, d spaced from the target by distances proportional to the sine of the angle between the trajectory and the lines of sight passing through the points 7a, b, c, d on the trajectory. If the target is stationary, the designated points on the trajectory appear in the field of the telescope directly above and below the target as shown on the right hand circle of Fig. 4. If the target is moving, the operator maintains the telescope directed toward the target, thereby causing the target to appear in the center of the telescope field. If this motion is

2 uniform (the target maintaining substantially constant velocity), the motion of the telescope, and hence the relative motion of points 7d, 7c, 7b and 7a (if a projectile successively explodes at each of them) is proportional to the distance from the target to each of these points. In this case these points (if visible) would appear as shown in the right hand circle of Fig. 5.

Since the purpose of spotting is to correct for errors in the gun pointing, the spotter is interested in the relation of the actual shell burst to the predicted position of the shell burst (the position of the shell burst corresponding to the pointing of the gun). Spotting is complicated by the fact that the error in the firing of the time fuse is usually greater than the error in gun pointing. This means that a shell having a trajectory passing through the target (corresponding to perfect gun pointing) may burst away from the target and indicate an apparent error in gun pointing when in fact there is no error in gun pointing, but only an error in the firing of the time fuse. For this reason, the spotting is divided into two parts; (1) a determination of the position of the burst with reference to the target on the field of the spotting telescope and (2) a determination of the range of the burst. The first gives the apparent error in gun pointing; the second eliminates that part of the apparent error in gun pointing due to the error in the firing of the time fuse. From this information a correction in the gun pointing can be obtained.

For determining the apparent position of the burst, the operator is provided with a scale in the field of the telescope indicating points in the predicted trajectory of the shell in the vicinity of the target as these points would appear upon successive explosions of a shell following the predicted trajectory. This scale may be provided by any one of various means for producing points marked in accordance with the appearance on the telescope field of shell explosions taking place at positions 7d, 7c, 7b, and 7a. For example, a mechanism such as that shown in Figs. 2 and 3 may be used, this mechanism utilizing transparent reflector 9 arranged at an angle of 45 degrees across the outer end of the telescope. Being transparent, the reflector does not interfere with the operator's view of the target. Tube 10 at right angles to the telescope (and at 45 degrees to the reflector) contains a colored light source 11 associated with a lens system 12 and an adjustable reticle 13 to project colored spots of light on the operator's side of the reflector which will be reflected to the eyepiece of the telescope and appear in the field of vision thereof.

It is the purpose of the lens system 12 to cause the points of light on reflector 9 to appear at the distance of the target as viewed from the telescope eyepiece. To this end, two lenses are provided. One of these is mounted adjacent to lamp 11 and acts as a condensing lens to produce a maximum amount of parallel light rays at reticle 13. The second lens is placed on the opposite side of reticle 13 and is arranged to cause the luminous points on reticle 13 to appear in focus as viewed from the telescope eyepiece. Hence, if the telescope is adjusted to show objects at an infinite distance in focus, the second lens is located at a distance equal to its own focal length from reticle 13 so that these points also appear at an infinite distance.

It is, of course, necessary to adjust the position of the spots in the telescope field in accordance with the velocity, range, elevation, and azimuth of the target as well as other factors (such as wind velocity) which influence the relative position of the points in the telescope field corresponding to actual successive shell bursts at positions 7d, 7c, 7b, and 7a. This can be accomplished by obtaining these data by measurement prior to the time of directing the gun and then arranging reticle 13 in the telescope to provide luminous points at the correct positions. Devices to obtain these data by use of optical or radio pulse-echo phenomena are well known in the art, being generally designated as fire control systems and including means taking into account all the various conditions influencing the flight of the projectile. In the illustrative mechanism shown in Figs. 2 and 3, a limited amount of adjustment is provided by reticle 13 which includes two disks, 31 and 32, the former having a single long slit 14, Fig. 3, which is positioned at an axis corresponding to the velocity of the target and the latter having apertures 15, Fig. 3, spaced in accordance with the desired distance between points a, b, c, and d, (Figs. 4 and 5) along that axis. If, for example, disk 31 is positioned so that slit 14 is vertical, thus to indicate the predicted position of shell bursts for the case of a particular stationary target, rotation of both disks to a new position at which the slit is at an angle with the vertical produces points coresponding to the predicted position of shell bursts for the case of a moving target having a particular range, velocity, elevation, etc.

When all of the corrections are applied, the operator sees in the field of the telescope the target, spots indicating the predicted positions of the shell at ranges in the vicinity of the target, and the burst of the shell. This information alone is not sufficient for correcting the gun pointing. The operator must also know the range of the burst since the error in the time fuse may be greater than the error in gun pointing.

The range of the burst is obtained from a radio locating equipment having a directional antenna, shown as the paraboloidal antenna 16, mounted for movement with the telescope and connected to a transmitter 17 transmitting periodic pulses 18 of radio waves and also connected to a receiver 19 for receiving reflections (echoes) of the transmitted pulses. Associated with the receiver is a cathode ray tube having a viewing screen 20 on which the reflections from the burst and the target appear as deflections 21 and 22 on a scale indicating the respective ranges. It has been observed that the shell explosion acts as a reflector of radio waves permitting the location of the burst, but the time during which the explosion serves as a reflector is short. It is proposed in accordance with the present invention that the reflecting characteristics of the burst be improved both as to duration and intensity by arranging wires having a length equal to a half wavelength of the radio frequency waves (2" at 10 c. m. wavelength) in compartments 23 in the shell (Figs. 6 and 7) so that the dispersion of these wires by the force of the explosion creates a persistent cloud of antennas which serves as a reflector of the radio waves and enables a more precise determination of the range of the burst.

The effectiveness of the dispersed antenna wires as a reflector has been tested by putting the bundles of fine wires in a small balloon exploded by a fuse. Tests were made with from 100 to 200 wires having length substantially equal to one half the wave length of the radio waves employed in which it was found that the fine wires dispersed by the force of the explosion persisted in space for several seconds and gave a strong echo. It was found that the echo was of about the same strength as that observed from a thread 100 feet long carrying the same number of uniformly spaced wires. The echo from a string of wires had a very marked pulsation in strength of about two or three times per second, whereas the echo from the scattered wires had a much more rapid pulsation giving an almost continuous image of a quivering character. The echo from the scattered wires was thus distinguishable from the echo from an airplane or a fixed target.

After it had been established that a string of wires has the same strength of echo as the scattered wires, the number of wires on the string was varied from 50 to 400. In these tests it was found that the echo strength increased in proportion to the number of wires up to about 150 wires, whereas the echo strength with 400 wires was decidedly inferior. This was in accordance with expectations because the string with 400 wires had these wires spaced on 3" centers so that there was only 1" interval between adjacent wires. Analysis of this arrangement indicates that adjacent wires reflect echoes nearly out of phase with each other, so that the echoes are reflected largely upwards and do not return to the receiver. The conclusion from this test is that the strength of the echo is proportional to the number of wires provided the scattering is such that the wires are on the average at least a couple of wavelengths apart. Greater spacing is desirable. Results of these tests and comparisons with echoes from airplanes indicate that 500 to 1000 wires when properly scattered (two or more wavelengths apart) give an echo of about the same strength as an airplane.

One set of tests was made to determine the importance of having the wires tuned to the wavelength of the radiation. For this purpose comparisons were made between wires 1", 2", and 3" long, 2" being one-half wavelength. The 1" wires gave practically no echo although twice as many were used as of the 2" wires. The number of 3" wires was the same as the number of 2" wires but the echo from the 3" wires was about one-third as strong.

Some question might be raised as to whether the shell fragments would not serve as a proper reflector. The shell fragments, being larger, do not persist in space and are not properly proportioned or sufficiently numerous to provide nearly as reliable an echo.

Having determined the range of the burst, the operator now has all of the information necessary to correct the gun pointing. Error in the lay of the gun is measured by the observed displacement of the actual burst with respect to the point on the scale indicating the predicted positions of the burst corresponding to the observed range. The manner of obtaining the correction for the error in lay of the gun is shown in Figs. 4 and 5 for the cases of stationary and moving targets. In these figures, the scale for the predicted positions of the shell in its trajectory at ranges in the vicinity of the target is designated by the letters a, b, c, d in which the distances represented by these letters are measured from the target and accordingly represent errors in the range at which the shell bursts. In Fig. 4 on the viewing screen of the cathode ray tube 20, the relative positions of the reflections 22 and 21 from the target and burst respectively show that the shell bursts a distance "a" from the target. In the field of vision of spotting telescope, the burst appears at point 24. The indicated correction which the operator feeds to the gun director 25 is measured by the line 26. For the same gun pointing, if the shell had burst at the range of the target, the reflections 21 and 22 would have been coincident on the viewing screen of the cathode ray tube 20 and the shell would have appeared in the field of the spotting telescope at point 27. For this case, the indicated correction for the error in lay of the gun is measured by the line 28, a correction the same as that indicated by the line 26. The difference between the positions of the bursts 24 and 27 in the field of the spotting telescope is due to an error in the firing of the time fuse. For point 27, where the time fuse fires correctly, the correction for error in gun lay is obtained directly from the spotting telescope. Points at which there is no error in the firing of the time fuse are the only points at which the optical position of the burst in the field of the spotting telescope gives the necessary information to correct the lay of the gun. For all other points, where there is an error in the firing of the time fuse, there is an error in the apparent position of the burst due to the time fuse. In Fig. 5 the burst appears at 29 and the correction is indicated by the line 30.

The manner in which the spotting correction is fed to the gun director will depend upon the design of the gun director. In general, the spotting correction will be fed into the gun director in a manner such that it will affect the results obtained from the gun director, but not the manner of operation.

Where there are a plurality of targets and bursts in the field of the splotting telescope and on the screen of the cathode ray tube, the judgment of the operator is relied upon to disregard the non-pertinent information. The timing of the bursts and the information as to range will, according to the laws of probability, assist in discriminating.

While I have shown a particular embodiment of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States, is:

1. A system for locating the burst of an exploding body comprising means for transmitting pulses of radio waves having a high frequency, means for receiving reflections of said transmitted pulses, and a plurality of antennas carried by said exploding body and arranged to be dispersed by the force of the explosion to provide a cloud of antennas serving as a persistent reflector, said antennas each being tuned to resonate substantially at said frequency, whereby the burst may be more accurately observed.

2. In combination with a radio locating equipment functioning through the reflection of radio waves of a high frequency for locating the burst of an exploding body, a plurality of antenna elements carried by the exploding body and arranged to be dispersed by the force of the explosion to provide a cloud of antennas for improving the reflecting characteristics of the explosion, each of said elements having an effective length substantially equal to an even multiple of a quarter-wavelength at said frequency, whereby the burst may be more accurately located.

3. In combination with radio locating equipment operating by reflection of radio waves of a high frequency, an explosive shell containing a plurality of antenna wires arranged to be dispersed by the force of the explosion to form a cloud of antennas serving as a reflector for locating the burst, each of said antenna wires having an effective length substantially equal to an even multiple of a quarter-wavelength at said frequency, whereby said wires constitute efficient reflectors for said waves.

ERNST F. W. ALEXANDERSON.

REFERENCES CITED

The following references are of record in the file of this patent:

UNITED STATES PATENTS

| Number | Name | Date |
|---|---|---|
| 1,297,873 | Laurie | Mar. 18, 1919 |
| 1,305,967 | Hawks | June 3, 1919 |
| 1,363,861 | Fiske | Dec. 28, 1920 |
| 1,682,034 | Burmister | Aug. 28, 1928 |
| 1,705,146 | Willson | Mar. 12, 1929 |
| 1,716,821 | Karnes | June 11, 1929 |
| 1,846,854 | Eppenstein | Feb. 23, 1932 |
| 1,913,793 | Clementi et al. | June 13, 1933 |
| 1,924,156 | Hart | Aug. 29, 1933 |
| 1,987,765 | Wandersleb | Jan. 15, 1935 |
| 2,190,569 | Macgill | Feb. 13, 1940 |
| 2,268,643 | Crosby | Jan. 6, 1942 |
| 2,408,742 | Eaton | Oct. 8, 1946 |
| 2,409,462 | Zworykin | Oct. 15, 1946 |
| 2,419,205 | Feldman | Apr. 22, 1947 |

FOREIGN PATENTS

| Number | Country | Date |
|---|---|---|
| 113,233 | Australia | June 2, 1941 |
| 495,264 | France | June 24, 1919 |
| 399,751 | Great Britain | Oct. 12, 1933 |
| 428,759 | Great Britain | May 17, 1935 |
| 814,937 | France | Mar. 30, 1937 |